(12) United States Patent
Vietz

(10) Patent No.: US 10,202,282 B2
(45) Date of Patent: Feb. 12, 2019

(54) PROCESS FOR PRODUCING POLYCRYSTALLINE SILICON

(71) Applicant: Wacker Chemie AG, Munich (DE)

(72) Inventor: Matthias Vietz, Mattighofen (AT)

(73) Assignee: WACKER CHEMIE AG, Munich (DE)

( * ) Notice: Subject to any disclaimer, the term of this patent is extended or adjusted under 35 U.S.C. 154(b) by 297 days.

(21) Appl. No.: 15/123,160

(22) PCT Filed: Feb. 27, 2015

(86) PCT No.: PCT/EP2015/054156
§ 371 (c)(1),
(2) Date: Sep. 1, 2016

(87) PCT Pub. No.: WO2015/132155
PCT Pub. Date: Sep. 11, 2015

(65) Prior Publication Data
US 2017/0057830 A1 Mar. 2, 2017

(30) Foreign Application Priority Data

Mar. 3, 2014 (DE) .................. 10 2014 203 814

(51) Int. Cl.
| | |
|---|---|
| *B65D 5/56* | (2006.01) |
| *C01B 33/021* | (2006.01) |
| *B65B 1/00* | (2006.01) |
| *C01B 33/035* | (2006.01) |
| *B65B 1/04* | (2006.01) |
| *B65B 63/00* | (2006.01) |

(52) U.S. Cl.
CPC .............. *C01B 33/021* (2013.01); *B65B 1/00* (2013.01); *B65B 1/04* (2013.01); *B65B 63/00* (2013.01); *B65D 5/563* (2013.01); *C01B 33/035* (2013.01)

(58) Field of Classification Search
CPC ....................................................... B65B 1/00
USPC ........................................................... 53/435
See application file for complete search history.

(56) References Cited

U.S. PATENT DOCUMENTS

| | | | |
|---|---|---|---|
| 8,398,946 | B2 | 3/2013 | Hertlein et al. |
| 8,833,042 | B2 | 9/2014 | Wochner et al. |
| 2013/0189176 | A1 | 7/2013 | Wochner et al. |
| 2013/0269295 | A1 | 10/2013 | Mattes et al. |
| 2013/0309524 | A1 | 11/2013 | Vietz et al. |

FOREIGN PATENT DOCUMENTS

| | | |
|---|---|---|
| CN | 103213988 A | 7/2013 |
| DE | 10 2007 027 110 A1 | 12/2008 |
| EP | 0 338 682 A3 | 10/1989 |
| EP | 2 666 750 A1 | 11/2013 |
| JP | 3035024U1 U1 | 4/1991 |
| WO | 2009/047107 A2 | 4/2009 |

*Primary Examiner* — Lori Baker
(74) *Attorney, Agent, or Firm* — Brooks Kushman P.C.

(57) ABSTRACT

Polycrystalline silicon chunks are packed for further processing and/or for shipment with minimal contamination by introducing the chunks into a cardboard container lined with a non-contaminating plastic. The process is economical, avoids the problems associated with packaging in plastic bags, and provides far less contamination and spillage during transport.

10 Claims, 1 Drawing Sheet

PROCESS FOR PRODUCING POLYCRYSTALLINE SILICON

CROSS REFERENCE TO RELATED APPLICATIONS

This application is the U.S. National Phase of PCT Appln. No. PCT/EP2015/054156 filed Feb. 27, 2015, which claims priority to German Application No. 10 2014 203 814.6 filed Mar. 3, 2014, the disclosures of which are incorporated in their entirety by reference herein.

BACKGROUND OF THE INVENTION

1. Field of the Invention

The invention relates to a process for producing polycrystalline silicon.

2. Description of the Related Art

Polycrystalline silicon (polysilicon) is predominantly deposited on thin rods from halosilanes such as trichlorosilane by means of the Siemens process, which gives polycrystalline silicon rods, which are then comminuted into polycrystalline silicon chunks. After the comminution into chunks, it is customary to classify these into particular size classes. After sorting and classification, the chunks are dosed to a particular weight and packed in a plastic bag. A corresponding method for sorting, classification, dosage and packing of chunks is known from US 2013309524 A1.

For applications in the semiconductor and solar industries, chunk polysilicon with a minimum level of contamination is desired. It is therefore desirable that the comminution into chunks, sorting and classification, dosage and packing be effected with a minimum level of contamination.

Typically, the chunks have to be transported from one apparatus to another between the individual processing steps, for example from the comminution apparatus to the packing machine. In this case, it is customary to store the chunks intermediately in what are called buffer vessels, typically plastic boxes.

The last processing step is always packing in plastic bags, but is problematic because of the fact that chunk polysilicon is a sharp-edged, non-free-flowing bulk material which can penetrate the plastic bag in the course of filling or in the worst case even completely destroy it.

DE 10 2007 027 110 A1 discloses, for this purpose, a method for packaging polycrystalline silicon, comprising filling polycrystalline silicon by a filling device into a freely suspended, completely formed bag, and closing the bag thus filled, wherein the bag consists of high-purity plastic with a wall thickness of from 10 to 1000 μm, where the filling device comprises a freely suspended energy absorber of a nonmetallic low-contamination material, which is introduced into the plastic bag before filling with the polycrystalline silicon and by means of which the polycrystalline silicon is filled into the plastic bag, and the freely suspended energy absorber is then removed from the plastic bag filled with polycrystalline silicon, and the plastic bag is closed.

Such a method, which provides for an energy absorber within the plastic bag, can largely prevent puncturing of the plastic bag during the packing. However, this applies only to small or light chunks.

It has been found that the risk of bag damage increases proportionally with the chunk mass.

One conceivable way in principle of reducing the puncture rate by strengthening the bag film has not been found to be very practicable, especially since such a less pliable film would be difficult to handle. The packing machines being used are not designed for films having a thickness greater than 350 μm. Moreover, it would take longer to weld such thick bags, which reduces the throughput.

Such puncturing of the bag can occur not just during the packing operation but also in the course of transport to the customer. Chunk polysilicon is sharp-edged, and so, in the event of unfavorable orientation of the chunks in the bag, relative movement of the chunks to the bag film and pressure of the chunks on the bag film result, respectively, in the chunks cutting through and penetrating the bag film.

Experience has shown that bags made from commercial PE films filled with chunk polysilicon exhibit weld seams that have been torn open in the course of or after transport.

Chunks protruding from the bag packing can be unacceptably contaminated directly by surrounding materials, and chunks inside as a result of inflow of ambient air. This problem is also manifested in the case of so-called double bags, in which the polysilicon is filled into a first bag and this first bag is subsequently introduced into a second bag.

For larger chunks, US 20130269295 A1 discloses a method for packing polycrystalline silicon in the form of chunks or round rods having a weight of greater than 2 kg and a size of 90 to 170 mm, wherein at least one film in each case is inserted into a cuboidal cardboard box matched to the dimensions of the polycrystalline silicon to be packed, the polycrystalline silicon is introduced into the at least one film, the at least one film subsequently being welded and enclosing the polycrystalline silicon. The polycrystalline silicon which is in the form of a chunk or round rod and has a weight of greater than 2 kg and a size of 90 to 170 mm is surrounded by at least one film which has a thickness of 10 to 200 μm and encloses the polycrystalline silicon, this at least one film being surrounded by a further film having a reinforcing structure. After the films have been welded, the polycrystalline silicon is introduced into a transport vessel comprising separating elements or cardboard boxes.

In this way, puncturing during transport is supposed to be avoided more effectively in the case of larger chunks.

In principle, the idea is thus to transport the chunks in plastic boxes and, as a final step, to pack them in plastic bags or films.

SUMMARY OF THE INVENTION

An object of the invention was to provide a less expensive and more economically viable process. These and other objects are achieved by a process for producing polycrystalline silicon, comprising providing polycrystalline silicon rods, comminuting the polycrystalline silicon rods into polycrystalline silicon chunks and packing of the polycrystalline silicon chunks by introducing the polycrystalline silicon chunks into a cardboard container comprising a base, a wall and an opening, wherein at least the inner surfaces of the base and wall which come into contact with the polycrystalline silicon chunks have been coated with plastic.

DETAILED DESCRIPTION OF THE PREFERRED EMBODIMENTS

Figure 1:
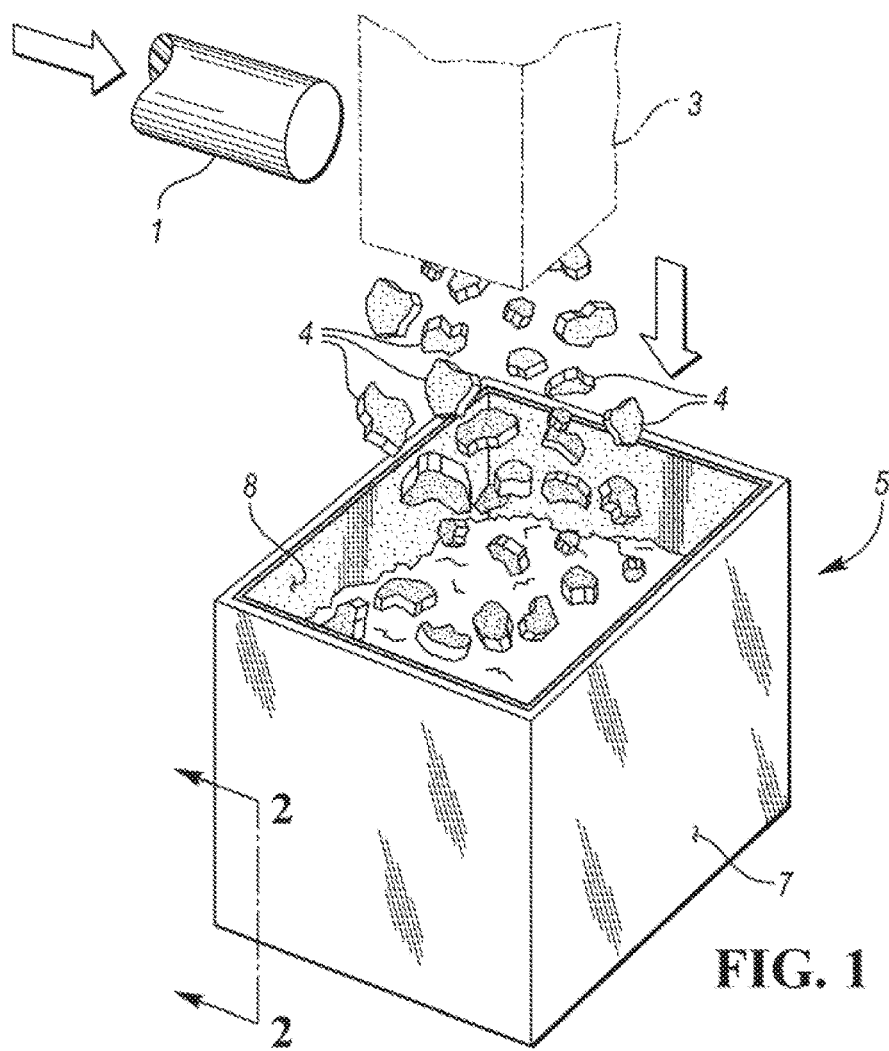
FIG. 1 illustrates one embodiment of the process of the invention.

The polycrystalline silicon is preferably deposited on heated thin silicon rods, using a silicon-containing component and hydrogen as reaction gas (Siemens process). Preferably, the silicon-containing component is a chlorosilane, more preferably trichlorosilane. The deposition is effected according to the prior art, reference being made, for example, to WO 2009/047107 A2.

After the deposition, the polycrystalline silicon rods are comminuted. Preferably, there is first a preliminary comminution of the polysilicon rods. For this purpose, a hammer made from a low-abrasion material, for example cemented carbide, is used. The preliminary comminution is effected on a workbench having a surface that preferably consists of wear-resistant plastic or of silicon.

This is followed by comminution of the pre-comminuted polysilicon to the desired target size of chunk size 0, 1, 2, 3, 4 or 5. The chunk size is defined as the longest distance between two points on the surface of a silicon chunk (=max. length) as follows:

Chunk size (CS) 0 [mm] 0.1 to 5
Chunk size 1 [mm] 3 to 15
Chunk size 2 [mm] 10 to 40
Chunk size 3 [mm] 20 to 60
Chunk size 4 [mm] 45 to 120
Chunk size 5 [mm] 100 to 250

In this context, at least 90% by weight of the chunk fraction in each case is within the size ranges mentioned.

The comminution is effected by means of a crusher, for example with a jaw crusher. Such a crusher is described, for example, in EP 338 682 A2.

Subsequently, the crushed silicon is optionally classified into the abovementioned chunk sizes by means of a mechanical screen. Before that, it is preferably packed in a cardboard container and transported from the comminution apparatus to an apparatus that sorts and classifies it.

Optionally, the chunks are cleaned before the final packing. For this purpose, the classified silicon is packed in a cardboard container and transported to the cleaning apparatus. Preference is given to using the same cardboard container in which the chunks were packed after the comminution.

In the cleaning operation, preference is given to using a cleaning solution comprising $HNO_3$ and HF.

Preferably, the polysilicon chunks are washed with an oxidizing cleaning solution in a preliminary cleaning operation in at least one stage, washed with a cleaning solution comprising $HNO_3$ and HF in a main cleaning operation in a further stage and, in the case of hydrophilization, washed with an oxidizing cleaning fluid in yet a further stage. The preliminary cleaning is preferably effected by means of $HF/HCl/H_2O_2$. The hydrophilization of the silicon surface is preferably effected by means of $HCl/H_2O_2$.

After the cleaning or directly after the comminution (if no cleaning is effected), the polysilicon chunks are packed in a cardboard container. This is preferably a cardboard container comprising a base, a wall and an opening, wherein at least the inner surfaces of the base and wall which come into contact with the polycrystalline silicon chunks have been coated with plastic. Preferably, the cardboard containers used in the packing after the cleaning are the same as those in which the chunks were packed after the comminution.

Cardboard is a material produced from cellulose, wood pulp and used paper, the use of which is customary in the packing industry for protection of packed goods. It is essentially paper having a greater thickness. Cardboard generally has multiple plies, i.e. consists of several plies of paper of different thickness, which are pressed together without using adhesive.

Preferably, the cardboard container is closed after being filled with the polycrystalline silicon chunks. This is preferably done using a cover which likewise consists of cardboard (cardboard box lid). More preferably, the inner surfaces of the cover facing the polycrystalline silicon chunks have likewise been coated with plastic.

The plastic coating preferably has a thickness of 50 µm to 500 µm.

The plastic used contains preferably less than 100 ppbw of boron, less than 100 ppbw of phosphorus and less than 10 ppbw of arsenic.

The plastic is preferably selected from the group consisting of polypropylene (PP), polyethylene (PE), polyurethane (PU), polyvinylidene fluoride (PVDF), polyvinylidene chloride (PVDC) and polysiloxane (silicone).

The cardboard container may have been lined, laminated, sprayed or vapor-coated with plastic.

The coating can be effected, for example, with aqueous polymer dispersions or in an extrusion process. In the case of extrusion coating, polymer pellets are used, which are converted to a liquid thermoplastic melt. The liquid melt is applied to the carrier web.

Preferably, the polycrystalline silicon chunks, in each case after the comminution, after an optional sorting and classifying step and after an optional cleaning step, are packed in an aforementioned cardboard container with plastic coating and transported to the next processing step.

Preferably, the polycrystalline silicon chunks, after the last processing step, are packed in an aforementioned cardboard container with plastic coating and transported to the customer.

The cardboard container is more preferably used both for transport of the chunks between apparatuses in the manufacturing process and as the final packing container which is transported to the customer.

This leads to a lower space requirement and to an increase in productivity.

This constitutes a considerable advantage in the production process. No plastic bags are used. It is therefore possible to avoid the problems known from the prior art.

The cardboard box size can be varied as desired by the customer.

A preferable net weight is from 5 kg to 1200 kg.

Particular preference is given to a net weight of 5 kg to 500 kg, more particularly to a net weight of 10 kg to 40 kg.

Because of the flexible cardboard box sizes, it is also possible to retrofit existing manufacturing plants without any great cost and inconvenience.

After filling, the cardboard boxes can be automatically welded or sealed.

Preferably, the cardboard containers have a rectangular shape. This enables easy automation of further processing.

The use of commercial pallet systems is possible and preferred. The cardboard containers are preferably secured on a pallet, more preferably lashed down.

Especially in the case of packing of chunks of chunk sizes 0-3, no adverse effects at all on the product properties (contamination, puncture, formation of fines) have been found.

In the case of packing of chunks of chunk sizes 4 and 5, it has been found to be advantageous to provide a layer thickness of the plastic coating of at least 250 µm on the inside of the cardboard box.

In the course of packing, the chunks can be dosed directly into the container. It is possible to use standard packing machines or robots with grab arms. A relatively low level of fines arises in the course of filling of the container.

If the container is filled manually, preference is given to using gloves made from high-purity polyethylene or made from PU. The material of which the gloves consist should contain less than 100 ppbw of boron, less than 100 ppbw of phosphorus and less than 10 ppbw of arsenic.

In the case of the prior art plastic bags, it was generally necessary to pre-shape the bags, for example by means of a shaping tube, or by pulling the bag over a collar. There is no need to do this in the process according to the invention since a cardboard container is being used. The problems with punctures known from the prior art do not occur.

There is no need for the visual monitoring for damage to the packing material, which is required in the prior art.

The cardboard container preferably comprises operating elements secured to the outer wall of the container in order to enable gripping and holding of the cardboard container.

Figure 2:
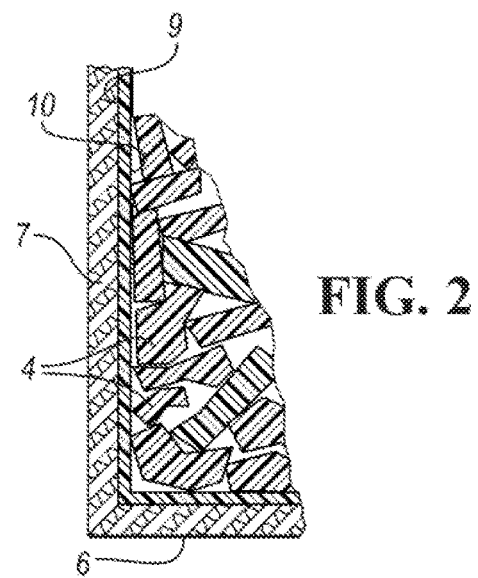
FIG. 2 illustrates in larger detail, the walls, base, and plastic lining of the box of FIG. 1.

FIGS. 1 and 2 illustrate one embodiment in a process for producing polycrystalline silicon, comprising providing polycrystalline silicon rods 1, comminuting 3 the polycrystalline silicon rods into polycrystalline silicon chunks 4, and packing the polycrystalline silicon chunks by introducing the polycrystalline silicon chunks into a cardboard container 5 having a base 6, a wall 7, and an opening 8, wherein at least the inner surfaces 9 of the base and wall which come into contact with the polycrystalline silicon chunks have been coated with plastic 10.

The Invention claimed is:

1. A process for producing polycrystalline silicon, comprising providing polycrystalline silicon rods, comminuting the polycrystalline silicon rods into polycrystalline silicon chunks, and introducing the polycrystalline silicon chunks into a cardboard packing container comprising: a base, a wall and an opening, wherein at least the inner surfaces of the base and wall which come into contact with the polycrystalline silicon chunks, have a plastic coating.

2. The process of claim 1, wherein the plastic contains less than 100 ppbw of boron, less than 100 ppbw of phosphorus and less than 10 ppbw of arsenic.

3. The process of claim 1, wherein the plastic is selected from the group consisting of polypropylene, polyethylene, polyurethane, polyvinylidene fluoride, polyvinylidene chloride and polysiloxane.

4. The process of claim 1, wherein inner surfaces of the base and wall have been coated with plastic of a thickness of from 50 μm to 500 μm.

5. The process of claim 1, wherein the polycrystalline silicon chunks are introduced manually by a worker into the cardboard container, the worker wearing gloves made of PE or PU containing less than 100 ppbw of boron, less than 100 ppbw of phosphorus and less than 10 ppbw of arsenic.

6. The process of claim 1, further comprising sorting and classifying the polycrystalline silicon chunks into particular size classes prior to introducing the polycrystalline silicon into the container.

7. The process of claim 6, further comprising cleaning of the sorted and classified polycrystalline silicon chunks prior to introducing the chunks into the container.

8. The process of claims 1, wherein the polycrystalline silicon chunks, in each case after comminuting, after an optional sorting and classifying step, and after an optional cleaning step, are packed in a cardboard container with plastic coating on the inner surfaces thereof and transported to a further processing step.

9. The process of claim 1, wherein the polycrystalline silicon chunks are packed in a cardboard container with plastic coating on the inner surfaces thereof and transported to a customer.

10. The process of claim 9, wherein several cardboard containers are fixed on a pallet and transported to the customer.

* * * * *